(12) United States Patent
Raitola

(10) Patent No.: US 6,370,128 B1
(45) Date of Patent: Apr. 9, 2002

(54) METHOD FOR CONTROL CHANNEL RANGE EXTENSION IN A CELLULAR RADIO SYSTEM, AND A CELLULAR RADIO SYSTEM

(75) Inventor: Mika Raitola, Masala (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/155,174

(22) PCT Filed: Jan. 21, 1998

(86) PCT No.: PCT/FI98/00049

§ 371 Date: Sep. 22, 1998

§ 102(e) Date: Sep. 22, 1998

(87) PCT Pub. No.: WO98/33346

PCT Pub. Date: Jul. 30, 1998

(30) Foreign Application Priority Data

Jan. 22, 1997 (FI) .................................................. 970266

(51) Int. Cl.$^7$ ................................................ H04Q 7/00
(52) U.S. Cl. ........................ 370/329; 370/330; 455/450
(58) Field of Search ................................ 455/434, 436, 455/442, 450, 451, 452, 511, 561, 562; 370/330, 465, 468, 337, 345, 347, 329; 714/701, 708

(56) References Cited

U.S. PATENT DOCUMENTS

| 4,495,619 | A | * | 1/1985 | Acampora | ................... 370/104 |
| 5,121,395 | A | * | 6/1992 | Millar | ........................ 371/39.1 |
| 5,327,576 | A | * | 7/1994 | Uddenfeldt et al. | ........ 455/33.2 |
| 5,515,378 | A | * | 5/1996 | Roy, III et al. | ............. 370/95.1 |
| 5,606,548 | A | * | 2/1997 | Vayrynen et al. | ............ 370/252 |
| 5,655,215 | A | * | 8/1997 | Diachina et al. | ............. 455/426 |
| 5,757,813 | A | * | 5/1998 | Raith | ........................ 371/5.5 |
| 5,805,576 | A | * | 9/1998 | Worley, III et al. | .......... 370/337 |
| 5,933,421 | A | * | 8/1999 | Alamouti et al. | ............ 370/330 |
| 5,987,019 | A | * | 11/1999 | Raith | ......................... 370/347 |
| 6,028,864 | A | * | 2/2000 | Marttinen et al. | ........... 370/403 |
| 6,131,034 | A | * | 10/2000 | McLaughlin et al. | ........ 455/450 |

* cited by examiner

Primary Examiner—Mark Zimmerman
Assistant Examiner—Enrique Santiago
(74) Attorney, Agent, or Firm—Pillsbury Winthrop LLP

(57) ABSTRACT

A method and system for extending the range of control channels in a cellular radio system composed of, in each cell, at least one base station (BS) which is in contact with a plurality of mobile stations (MS) within its area. The base station transmits at least at one carrier frequency and a signal to be transmitted at each frequency being divided in the system, on a time-division basis, in frames composed of a plural number of time slots, and the base station transmits on the control channels information about itself to the plurality of mobile stations. In at least one time slot containing control channels there is used a stronger channel coding than in the time slots of traffic channels.

10 Claims, 3 Drawing Sheets

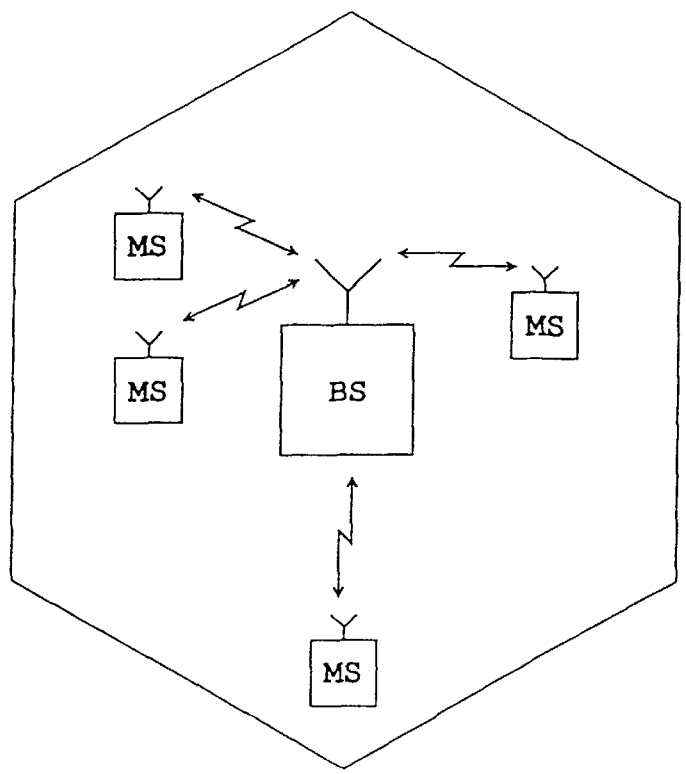
Fig. 1
| 0 BCCH | 1 TCH | 2 TCH | 3 TCH | 4 TCH | 5 TCH | 6 TCH | 7 TCH |
Fig. 2
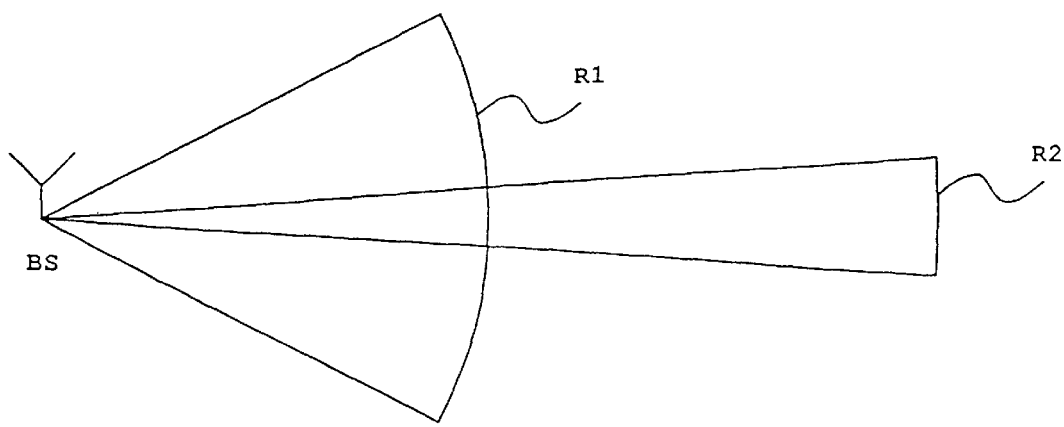
Fig. 3

| 0 BCCH | 1 BCCH | 2 TCH | 3 TCH | 4 TCH | 5 TCH | 6 TCH | 7 TCH |

METHOD FOR CONTROL CHANNEL RANGE EXTENSION IN A CELLULAR RADIO SYSTEM, AND A CELLULAR RADIO SYSTEM

The invention relates to a method for extending the range of control channels in a cellular radio system comprising, in each cell, at least one base station which is in contact with mobile stations within its area, the base station transmitting at least at one carrier frequency and a signal to be transmitted at each frequency being divided in the system, on a time-division basis, in frames comprising a plural number of time slots, and the base stations transmitting on the control channels information about themselves to mobile stations.

The invention also relates to a cellular radio system comprising, in each cell, at least one base station which is in contact with mobile stations within its area, the base station transmitting at least at one carrier frequency and a signal to be transmitted at each frequency being divided in the system, on a time-division basis, in frames comprising a plural number of time slots, and the base stations transmitting on the control channels information about themselves to mobile stations.

In cellular radio systems, a user's speech and data between a base station and a mobile station are transmitted on a traffic channel. Between a base station and a mobile station are also needed different control messages and system information. This information is transmitted on control channels. In a GSM system, for instance, a BCCH channel is used for transmitting connection set-up information from a base station to mobile stations. The BCCH channel is used for transmitting cell-specific information. Other channels transmitted in a first time slot, indicated by the number 0, of a BCCH carrier frequency are for instance AGCH and PCH, which are used for transmitting call set-up information, and SCH and FCCH, which are used for synchronizing a mobile station.

In the current GSM system, a carrier frequency that comprises a BCCH signal, i.e. a BCCH carrier frequency, is transmitted uninterrupted at an unvarying power level. A mobile station constantly measures the power level of the BCCH carrier frequencies transmitted by adjacent base stations and reports the measurement results to the base station serving the mobile station. On the basis of the measurement results, the system decides an appropriate moment for a handover to another base station. To ensure that the measurement results can be used for calculating signal attenuation between the base stations and the mobile station, BCCH carrier frequencies have to be transmitted at an unvarying power level.

In the current GSM system, a mobile station has a limited time for measuring the power levels of the BCCH carrier frequencies of adjacent base stations. A mobile station receiving a signal arriving from a base station in time slot 0 of a frame, transmits a signal to the base station in time slot 3 of the frame and measures adjacent base stations in time slots 5 and 6 of the frame. Since reception can take place in any time slots from 0 to 7 of a frame, transmission and the measurement of base stations can also take place in any time slots of a frame. For this reason, BCCH carrier frequencies of base stations are to be transmitted uninterrupted.

The requirement that in the current GSM system a BCCH carrier frequency is to be transmitted uninterrupted at an unvarying power level prevents the use of certain methods, developed for an improved connection quality and system capacity, at small capacity base stations that only have one radio part. The problem is not equally serious at base stations with a plural number of radio parts, although it degrades, there too, the quality of connection and the system capacity. To improve the quality of connection and the system capacity in cellular radio systems, methods such as frequency hopping, discontinuous transmission and adjustment of transmission power have been developed.

Frequency hopping means that a transmission frequency allocated to a connection is changed at predetermined intervals. Frequency hopping allows transmission quality to be improved particularly in cases where a mobile station moves very slowly or is stationary, as is often the case when hand-held phones are used for making a call. Frequency hopping is also useful when interference caused by a radio connection is spread over a plural number of frequencies, whereby a momentary interference in a particular frequency remains small.

Alongside with cellular radio systems based on conventional FDMA and TDMA methods, new techniques have been developed, with the aim of further improving the operation of cellular radio systems. One of the new techniques is SDMA (Space Division Multiple Access), which is used for improving the capacity of cellular radio systems. The SDMA technique is based on the use of directional antennas providing each traffic channel in use with a separate narrow antenna beam directed from a base station to a mobile station. Since transmission power is directed to a narrow antenna beam, the range of traffic channels increases substantially in comparison with the use of omnidirectional antennas. A narrow antenna beam also reduces disturbing interference caused by other traffic channels.

A problem with cellular radio systems based on directional antenna beams is that a base station does not know the location of mobile stations that are in an idle mode. Mobile stations in an idle mode listen to the control channels of adjacent base stations. Since a base station does not know the location of mobile stations that are in an idle mode, control channels must be transmitted to all directions simultaneously also at base stations applying the SDMA. An extension of the traffic channels of base stations applying the SDMA technique must therefore be somehow compensated also on control channels, to allow a significant benefit to be gained from the use of the SDMA. For extending the range of control channels, a method using frequency hopping on control channels has been developed. The benefit gained from frequency hopping is small when a mobile station moves at a great speed. Even when slowly moving mobile stations are concerned, frequency hopping does not provide an extension of control channel range equal to the extension of the range of traffic channels provided by the SDMA.

An object of the present invention is thus to extend the control channel range of a base station applying the SDMA technique to correspond to the range of the traffic channels of the base station in question.

This is achieved with a method described in the preamble, characterized in that in at least one time slot comprising control channels is used a stronger channel coding than in the time slots of traffic channels.

A cellular radio system of the invention is characterized in that base stations and mobile stations of the cellular radio system include means to use in at least one time slot comprising control channels a stronger channel coding than in the time slots of traffic channels.

A method and a cellular radio system of the invention provide clear advantages compared with the prior art. A method and a cellular radio system of the invention enable the range of control channels of a base station applying the SDMA technique to be extended to correspond to the range of the traffic channels of said base station. This allows the SDMA technique to be effectively utilized.

In the following the invention will be described in greater detail with reference to examples shown in the attached drawings, in which FIG. 1 illustrates a cellular radio system in which a method of the invention can be applied;

FIG. 2 illustrates a typical structure of a time-division frame in the current GSM system;

FIG. 3 illustrates an extending impact a narrow antenna beam of a directional antenna has on a range;

FIG. 1 illustrates a cellular radio system in which a method and a base station of the invention can be applied. In the cellular radio system, each cell has at least one base station BS, which is in contact with mobile stations MS within its area. In cellular radio systems, a user's speech and data traffic between a base station and a mobile station are transmitted on traffic channels. Between the base station and the mobile station are also needed various control messages and system information, which are transmitted on control channels. A method of the invention can be applied in any cellular radio system utilizing a time-division multiple access system TDMA. In the following, a method and a cellular radio system of the invention are described in connection with the GSM system, without restricting them, however, to the system.

FIG. 2 shows a typical structure of a BCCH carrier frequency frame of the current GSM system. The BCCH carrier frequency frame comprises eight time slots numbered from 0 to 7. Control channels are transmitted in a first time slot, indicated by the number 0, of a frame. In the GSM system, a BCCH channel is used for transmitting connection set-up information from a base station to mobile stations. The BCCH channel is used for transmitting cell-specific information. Other control channels transmitted in the first time slot of the BCCH carrier frequency include an AGCH and a PCH, which are used for transmitting call set-up information, and an SCH and an FCCH, which are used for synchronizing a mobile station. In time slots from 1 to 7 of the BCCH carrier frequency are transmitted traffic channels TCH.

FIG. 3 shows a longer range R2 of a narrow antenna beam of a directional antenna compared with a conventional range R1 of a broader antenna beam. A directional antenna used at a base station enables the range of the base station to be extended, i.e. the cell size to be enlarged, without increasing the transmission power of the base station.

Figures 4, 5:
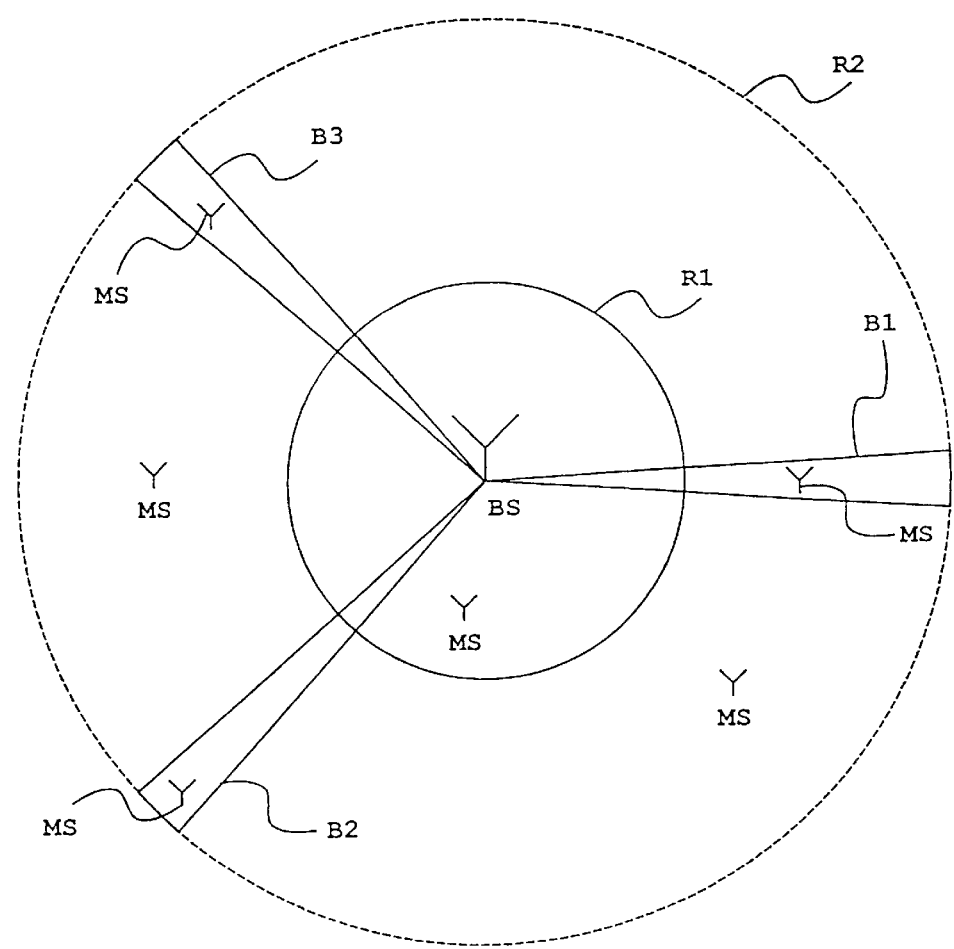
FIG. 4 illustrates a structure of a time-division frame of a method and a cellular radio system of the invention.
FIG. 5 illustrates an operational principle of a method and a cellular radio system of the invention.

FIG. 4 shows an example of a structure of a time-division frame of a method and a cellular radio system of the invention. A BCCH carrier frequency frame comprises eight time slots numbered from 0 to 7. Control channels are used in a first and a second time slot indicated by the numbers 0 and 1. In the GSM system, a BCCH channel is used for transmitting connection set-up information from a base station to mobile stations. The BCCH channel is used for transmitting cell-specific information. In time slots from 2 to 7 of the BCCH carrier frequency are transmitted traffic channels TCH. Two time slots of a frame are thus used in this example for transmitting control channels. The system, however, allows one or more time slots to be used, as needed, for transmitting control channels.

FIG. 5 illustrates an operational principle of a method and a cellular radio system of the invention. The example shown in FIG. 5 comprises a base station BS of a cell, the BS applying the SDMA technique, and a plural number of mobile stations MS within an area of the cell. The base station has traffic channel connections provided by narrow antenna beams B1 to B3 to three mobile stations. FIG. 5 shows control channel ranges R1 and R2 of the base station. R1 represents a base station control channel range which is provided by a conventional control channel coding of the system and which does not achieve the range of traffic channels. R2, in turn, is a base station control channel range provided by the strongest channel coding of the cell, which allows control channels to achieve a range equal to that of traffic channels.

Channel coding aims at improving the quality of a connection in an environment subject to disturbance. Disturbance is caused for instance by noise, interference, multipath propagation of a signal and by Doppler shift. Channel coding is an operation used for protecting a signal generated by speech coding against data transmission errors. Channel coding increases, compared with the original data, the number of bits to be transmitted, thereby reducing data transmission rate. An example of the channel coding schemes used is convolution coding.

A problem, therefore, with a base station BS applying the SDMA technique is that the range R1 of control channels transmitted simultaneously to all directions is short compared with the range achieved with the narrow directional antenna beams B1 to B3 of the traffic channels. In the method and the cellular radio system of the invention it is assumed that frequency hopping is used both on traffic and control channels, although this is not required in the method or the cellular radio system of the invention. Since even the use of frequency hopping is not sufficient for the range of control channels to reach a distance equal to the range of traffic channels, a stronger channel coding is used on control channels, to extend the range, than on traffic channels.

In the example shown in FIGS. 4 and 5: the first two time slots of a frame are used for transmitting control channels. In the control channels of a first time slot is then used the strongest channel coding of the cell, which provides the longest range R2. In the control channels of a second time slot can be used, as needed, either an equally strong or a weaker channel coding than in the control channels of the first time slot.

In order to be able to decode the channel coding of the control channels, mobile stations need to know in advance the coding scheme and the coding strength. In the method and the cellular radio system of the invention, information about the coding scheme and coding strength of the control channels in the first time slot are transmitted from a base station to mobile stations on an SCH channel, which the base station transmits to mobile stations for synchronization and which is transmitted in the first time slot before other control channels. In the method and the cellular radio system of the invention, a very strong channel coding is used in a synchronization burst to be transmitted in the first time slot. After mobile stations have received the information, on the SCH channel, about the coding scheme and the coding strength of the control channels in the first time slot, they can decode the coding of the control channels transmitted in the first time slot. Control channels in the first time slot, in turn, comprise the information about the coding scheme and the coding strength of control channels in the second time slot.

As mobile stations receive control channels, they measure at the same time the quality of the connection to a base station. If the measurements show that the audibility of the control channels is unnecessarily good, the mobile station in question requests from the base station a possibility to start listening to a time slot comprising control channels and coded with a weaker coding. If the base station sees the situation in the same way, it requests the mobile station to move to another time slot comprising control channels. If, on the other hand, the measurement results of the mobile station show that the audibility of the control channels is not sufficiently good, the mobile station requests from the base station a possibility to start listening to a time slot comprising control channels and coded with a stronger coding. The initiative for changing the time slot can also come from the base station.

FIG. 5 thus illustrates, by way of example, a GSM base station BS using the SDMA technique. The base station uses one carrier frequency, and frequency hopping is used on all control and traffic channels. Two first time slots of a frame are allocated for control channels in a manner shown in FIG. 4. In a first time slot comprising control channels is used a ¼-rate convolution coding and in a second time slot comprising control channels is used a ½-rate convolution coding. Because of a stronger coding, the range of the control channels in the first time slot is substantially longer than the range of the control channels in the second time slot, although data transmission rate in the first time slot is only a half of the data transmission rate in the second time slot.

When the mobile station MS synchronizes with a base station BS of a cell, the MS receives on an SCH channel transmitted in the frame's first time slot comprising control channels information about the ¼-rate convolution coding of the control channels in the first time slot. On the basis of this information, the mobile station is able to receive the control channels, such as BCCH and CCCH channels, that are in the first time slot. A BCCH channel in the first time slot, in turn, has information about the channel coding, which in this example is a ½-rate convolution coding, of the control channels that are in the second time slot comprising control channels. If the quality of the connection measured by the mobile station is unnecessarily good in the first time slot, the mobile station requests from the base station a permission to start using another time slot coded with a weaker coding. Mobile stations MS located far from the base station BS and within the area between the ranges R1 and R2 use the control channels in the first time slot coded with a strong coding. Mobile stations MS located within the area of the range R1 use, in turn, the control channels in the second time slot coded with a weaker coding. The method and the cellular radio system of the invention thus extend the range of control channels by means of a strong channel coding. Since a strong channel coding is only used when necessary, a minimum amount of data transmission capacity is lost.

Figure 6:
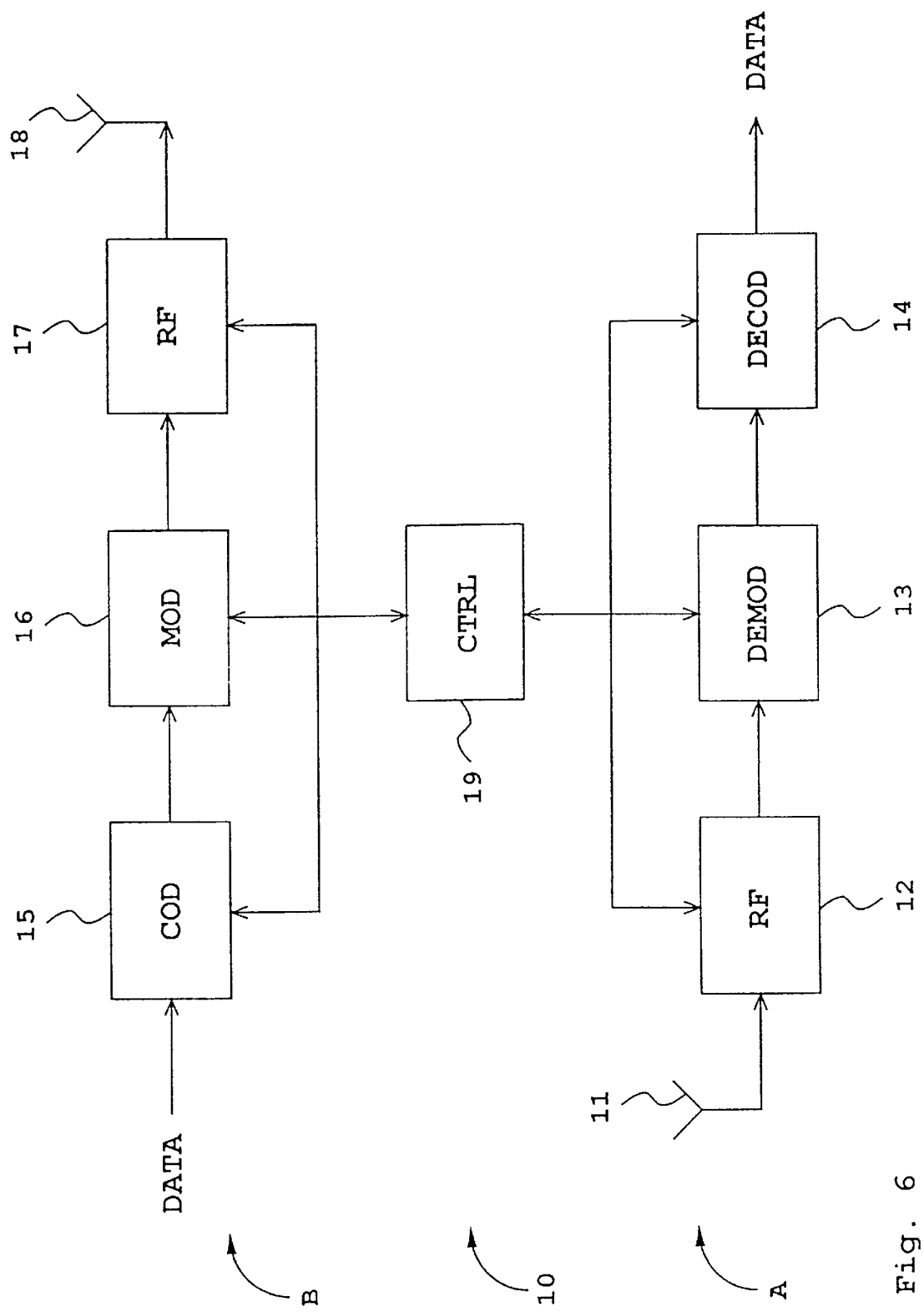
FIG. 6 is a block diagram illustrating a structure of a transceiver of a method and a cellular radio system of the invention.

Let us now study a structure of a transceiver of a cellular radio system of the invention. FIG. 6 is a block diagram illustrating, by way of example, the essential parts of a structure of a transceiver of the cellular radio system of the invention.

A transceiver 10 comprises a reception side A and a transmission side B. The reception side A comprises an antenna 11 which is used for conveying a received signal to radio frequency parts 12, in which the signal is converted to an intermediate or a base band frequency and in which the signal is converted to a digital form. From the radio frequency parts the signal is conveyed to demodulation means 13, in which the signal is demodulated and detected. From the demodulation means the signal is further conveyed to decoding means 14, in which channel coding and speech coding are decoded.

The transmission side B correspondingly comprises coding means 15 which are used for performing channel coding and speech coding and through which a signal is conveyed to modulation means 16 and further to radio frequency parts 17, which convert and amplify the signal to radio frequencies and transmit it by using an antenna 18. In addition, the transceiver comprises control means 19, which are common to the reception side A and the transmission side B. A transceiver according to the invention naturally also comprises other components, for instance filters, which is apparent to a person skilled in the art. For the sake of clarity, however, such components are not shown.

Base stations and mobile stations of the cellular radio system of the invention include means 14, 15 and 19 to use in at least one time slot comprising control channels a stronger channel coding than in the time slots of traffic channels.

Although the invention is described above with reference to an example illustrated in the attached drawings, it is apparent that the invention is not restricted to the example, but can be varied in many ways within the inventive idea disclosed in the attached claims.

What is claimed is:

1. A cellular radio system useful in at least SDMA transmission comprising:
   a plurality of mobile stations;
   a plurality of cells, each of the cells comprising at least one base station arranged to be in contact with a plurality of mobile stations an area of the base station, wherein:
   the base station is arranged to transmit at least one carrier frequency using SDMA and a signal to be transmited at each frequency being divided in the system, on a time-division basis, in frames comprising a plurality of time slots, at least one time slot comprising common control channels and a least one other time slot comprising a traffic channel,
   the base station is arranged to transmit on the common control channels information about itself to the plurality of mobile stations and in each traffic channel a signal intended for a respective mobile station, and
   the base station and the mobile stations of the cellular radio system include means for providing, in the at least one time slot comprising the common control channels, a stronger channel coding than in the at least one other time slot containing a traffic channel.

2. The cellular radio system according to claim 1 two time slots in each frame contain control channels and said means for providing are operative to impart channel coding of respectively different strengths to the control channels of the two time slots.

3. The cellular radio system according to claim 2 wherein the time slots in each frame include a first time slot containing control channels with the strongest available channel coding.

4. A cellular radio system according to claim 1 wherein the time slots in each frame include a first time slot containing control channels that include a SCH channel, and said means for providing are operative to transmit and receive information about the channel coding in the first time slot.

5. A cellular radio system according to claim 1 wherein the time slots in each frame include first and second time slots containing control channels, the control channels in the second time slot include a BCCH channel, and said means for providing are operative to transmit and receive information about the channel coding in the second time slot.

6. A method for extending a range of control channels in a cellular radio system useful in at least SDMA transmission including, in each cell, at least one base station which is in contact with a plurality of base stations within an area, the method comprising:

transmitting, by the base station, of at least one carrier frequency using SDMA;

dividing, in the system on a time-division basis, a signal to be transmitted at each frequency in frames comprising a plurality of time slots;

transmitting, by the base station on common control channels, information about the base station to the plurality of mobile stations, wherein at least one time slot comprising the common control channels uses a strong channel coding than time slots of traffic channels.

7. The method according to claim 6 wherein a mobile station receives information about channel coding used in a frame's second time slot, which comprises control channels on a BCCH channel transmitted in the frame's first time slot comprising the common control channels.

8. The method of claim 6, wherein a channel coding of a different strength from the channel coding of the common control channels is used in other time slots comprising other control channels.

9. The method of claim 8, wherein a strongest channel coding of a particular cell is used in a frame's first time slot comprising the common control channels.

10. The method of claim 6, wherein a mobile station receives information about a channel coding used in a frame's first time slot, which comprises the common control channels, on an SCH channel transmitted in the frame's first time slot comprising the common control channels.

* * * * *